United States Patent [19]

Hald

[11] Patent Number: 4,945,532
[45] Date of Patent: Jul. 31, 1990

[54] LOCAL NETWORK TESTING USING CARRIER SENSE MULTIPLE ACCESS AND COLLISION DETECTION (CSMA/CD)

[75] Inventor: André Hald, Villiers-Saint-Frederick, France

[73] Assignee: Bull, S.A., Paris, France

[21] Appl. No.: 323,888

[22] Filed: Mar. 15, 1989

[30] Foreign Application Priority Data

Mar. 18, 1988 [FR] France .................. 88 03576

[51] Int. Cl.[5] .................. H04J 1/16; H04J 3/14
[52] U.S. Cl. .................. 370/13; 370/85.3
[58] Field of Search .......... 370/13, 17, 85, 86, 370/88, 89, 95, 94; 371/22, 23, 24

[56] References Cited

U.S. PATENT DOCUMENTS 4,380,088  4/1983  Lipcon .................. 370/85
4,516,122  5/1985  Tomikawa ............... 370/85

FOREIGN PATENT DOCUMENTS 0133139  2/1985  European Pat. Off. .
59-167152  9/1984  Japan .

Primary Examiner—Douglas W. Olms
Assistant Examiner—Wellington Chin
Attorney, Agent, or Firm—Wolf, Greenfield & Sacks

[57] ABSTRACT

A tester for local networks of the carrier sense multiple access and collision detection type with a bus architecture transmission system. The network includes at least one elementary segment comprising a number of stations. The tester includes a transmission and reception circuit analagous to those of the stations, including, in addition, a collision generating device which emits a data frame when it has received from the encoding and decoding circuit associated with the transmission and reception circuit, a signal indicating the presence of a transmission of a frame by some station other than itself, and a transmission request from the transmission control circuit, this transmitted frame being received by the encoding and decoding circuit.

22 Claims, 9 Drawing Sheets

LOCAL NETWORK TESTER

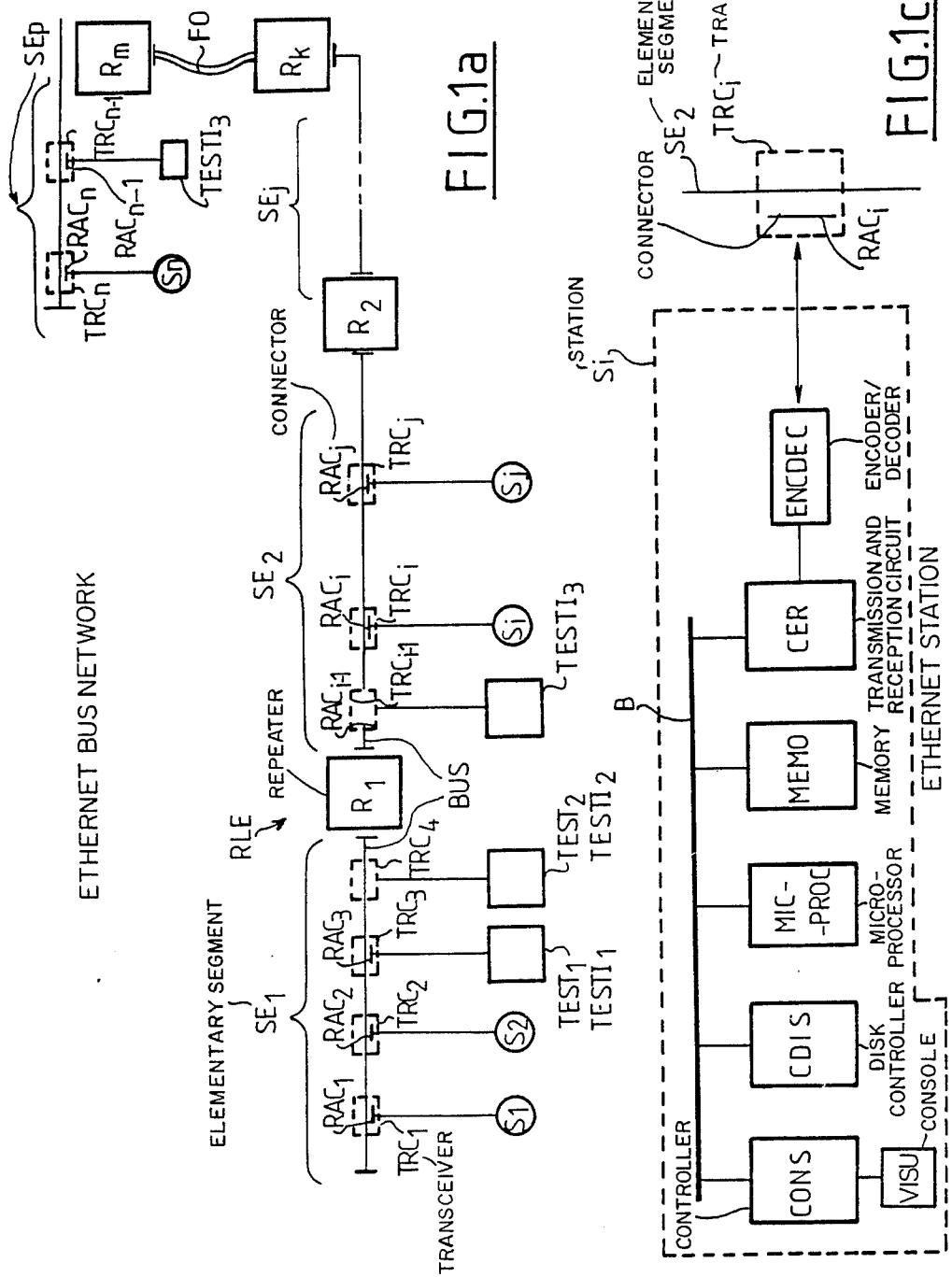

ETHERNET STAR NETWORK

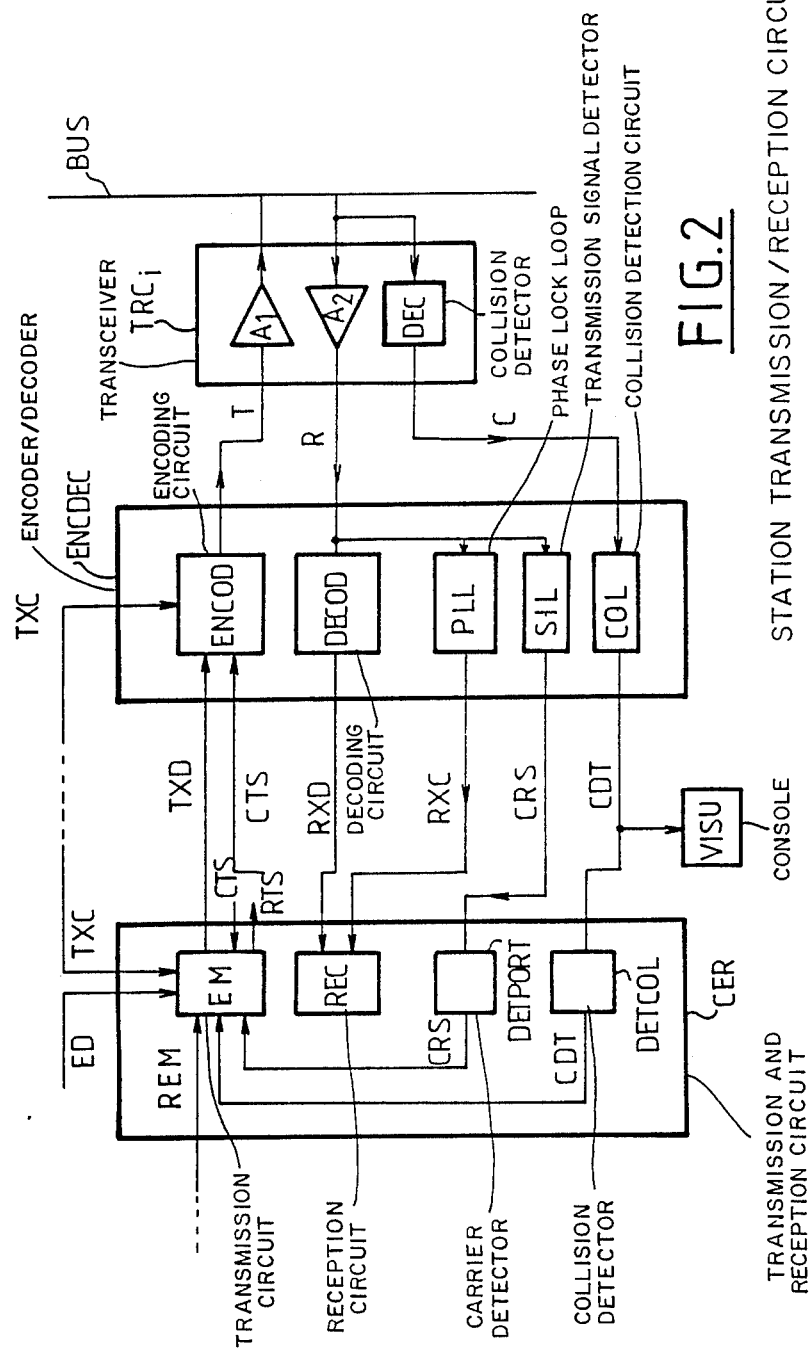

LOCAL NETWORK TESTING USING CARRIER SENSE MULTIPLE ACCESS AND COLLISION DETECTION (CSMA/CD)

FIELD OF THE INVENTION

The present invention concerns a local network tester of the carrier sense multiple access and collision detection type (CSMA/CD), for which the transmission system has a bus architecture. It is more particularly applicable to tests of proper functioning of collision detection circuits in local networks of the ETHERNET or STARLAN types.

BACKGROUND OF THE INVENTION

Since the 1970s, two categories of data transmission networks have become progressively more differentiated:

long-distance networks, based on the utilization of telephonic transmission media (for example transmission lines of the P.T.T. public utility in France), local networks, limited to a private domain (building, factory, campus, hospital), which are not dependent upon the characteristics of telephonic transmission lines.

Whether it belongs to the first categorY or the second category of transmission networks defined above, any network is constituted by a number of units, generally designated as data terminal equipment, abbreviated DTE, or in common parlance terminals or stations, These DTEs communicate with one another through the intermediarY of a transmission sYstem. This system may have a bus architecture, for example and can be constituted by a pair of telephone wires or a coaxial cable.

In local networks, data transmission is effected at higher rates than over long distance networks, for example 100 kbit/s to 100 Mbit/s, for distances between DTEs of from a few hundred meters to a few kilometers. (For long-distance networks, the DTE rates are generally less than 100 kbit/s.)

Because the DIEs of a local network with bus architecture share a single-transmission sYstem (transmission line), it is important that only one DTE at a time transmits onto the same transmission line. To resolve this problem, the DTEs are generally equipped with decision mechanisms which authorize the sending of messages only on condition that the line is free. For this, according to a preferred method, each terminal DTE continuously monitors the signals present on the line, and in the event that a message is present on the line, no other message is authorized to he sent. In this way the access methods conceived for local bus networks seek to limit conflicts of access due to simultaneous sending by more than one station (collisions). This process is familiar under the acronym CSMA.

However, despite this precaution, it can result that a station fails to detect the presence of a message on the transmission line at the instant it itself commands the sending of a message, although another station is in fact transmitting. In this type of network, this situation, termed "collision," is impossible to avoid entirely, notably because of the delay of propagation of signals on the line. To remedy this difficulty, generally a device is used termed a collision detector, which interrupts transmission of a message in progress when such a situation is detected. The detection of a collision causes cancellation of the transmIssion, following whIch a new attempt is made to transmit, with transmission taking place only if the transmission line has become free. This method is known under the acronym CSMA/CD (carrier sense multiple access with collision detection).

Local networks of the CSMA/CD type have been standardized by the IEEE committee of the Institute of Electrical and Electronic Engineers, in the form of a standard termed 802.3, (adopted by the ISO, International Standardization Organization. as the standard ISO 8802.3), whose essential provisions are the following:

a DTE, as a data transmitter, is either silent, or in the course of data transmission.

a DTE, when silent, can, as a receiver, either detect silence, or receive data coming from one or more other DTEs. If the data received are coming from more than one DTE at the same time, the value of this data is without significance, as is the case when in the presence of a collision.

a DTE which is in the course of transmission, can, as a a receiver, either detect that its transmission is proceeding normally (without collision with the data transmitted by one or more other DTEs), or that a collision is occurring.

The principles of the CSMA/CD access method are the following:
  (a) Each DTE which attempts to transmit data determines, before beginning, that it is receiving only silence, which must endure for at least a certain time (termed the interframe delay).
  (b) In the absence of collision, transmission is maintained for at least a certain duration; each set of data transmitted, termed a frame, must have a minimum length determined as a function of the duration of its propagation in the maximum standard configuration of the network.
  (c) After detection- of a collision, there is transmission of interference data, followed by a return to silence; this means that if a DTE detects a collision, it continues to transmit for a certain time, termed the jamming duration, then ceases to transmit. This duration is such that a frame suffering a collision is shorter than the duration defined in b above.
  (d) Upon reception, all data disPlaying an insufficient length is rejected (length less than the minimum length defined in b above).
  (e) In the event of interruption of a transmission, due to a collision, there is a repetition of the attempted transmission after a brief delay which increases from one attempt to the next, for a given frame, in a way which is sufficient that a high rate of collisions is not very probable.

The IEEE standard 802.3 elegantly defines the format of frames. The frame is an individual message. It is structured, and includes a starting and ending signal, synchronization signals, the address of the statIon to which the message is intended to be sent, the address of the sending station, the length of data, useful data, etc...
. In other words, the frame is the elementary block of information transmitted by any station, which passes over the transmission line.

The standard 802.3 additionally defines the protocol for the dialog between the stations. This protocol defines the rules of access to different stations, and thus constitutes a sYstem which regulates the communication among them, without organizing them hierarchically.

Thus, for a local network of the type of ETHERNET, with a transmission rate of 10 Mbit/s, the interframe duration is 9.6 microseconds (which corresponds to the duration of 96 bits), and the jam duration is 3.3 microseconds (which corresponds to the duration of 33 bits). The minimum length of the frame without collision is 64 octets (512 bits), and the maximum length is 1500 octets (12,000 bits).

The physical configuration of a local network of the type of ETHERNET is the following:

The standard transmission medium is a coaxial cable with characteristic impedance of 50 ohms, equipped at each end with a 50 ohm coupler. Each DTE is connected to the coaxial cable through a medium access unit, commonly termed a transceiver.

The basic network is constituted by a segment of cable along which access unit connectors are distributed.

More generally, a local network is formed by a set of a number of basic networks termed elementary segments, between which repeaters are installed. These retransmit onto one cable the signals theY receive on another cable, while restoring their initial signal quality. The functioning of a network with a number of segments is ensured if the network is constituted by one principal segment, and secondary segments, with each secondary segment connected to the principal segment either by a repeater or by a pair of repeaters connnected to one another. The repeaters and transceivers include collision detectors.

When a local network of the type of ETHERNET is first installed in the various buildings of a private facility, it is desirable to verify its functioning before the various stations are connected, by means of the access units, to the various segments of the network. This process is termed the acceptance of the network.

To do this, in general two testers are used, which are mobile stations, which can function in the same manner as the stations normally connected to the various segments of the network, and which in addition can create conditions of abnormal operation, in order to see whether these are detected at the various specific locations of the network bY particular components of it.

Testers are known whIch make it possible to verify proper functioning of a local network and in particular to verify whether detections of collisions are detected normally. One of these is the E-20 tester of the French company EXPERDATA, located at 14 rue de Silly, 92100 Boulogne.

This tester includes a generator of packets of frames which, in a continuous fashion, produces packets of small, medium and large size. The interframe delay can be caused to vary, and network traffic loads varying from 2% to the maximum rate of 99.2% can be obtained. (The maximum load, also called the maximum flow rate, is that which is obtained when a series of frames is sent separated from one another by the interframe delay of 9.6 microseconds defined above.) This tester can either transmit normally, respecting the CSMA/CD protocol, or function according to a collision mode, so as to deliberately provoke collisions; thus, in this case, when a collision detector fails to indicate a collision, it is considered to be defective.

The drawback of testers of the E-20 tYpe is their bulk, and the fact that they are made up of small discrete logic components. Moreover, they do not integrally implement the above-mentioned standard 802.3, notably in that they do not perform the standard Backoff algorithm (repetition of transmission of a frame, a predetermined number of times, when there is a collision).

SUMMARY OF THE INVENTION

The present invention enables these drawbacks to be remedied, by utilizing as a transmission and reception circuit of the tester a transmission and reception circuit currently employed in the stations of the network, embodied in the form of a very highly integrated circuit, but causing them to function in a collision mode, that is, in opposition to their normal mode of operation, given that, in these stations, the transmission and reception circuits, as specified in the lEEE standards 802.3 defined and summarized above, systematically seek to avoid any collision.

According to the invention, in contrast, when a frame has been transmitted by any one station of the network, in particular by one of the two testers, the transmission-reception circuit transmits so that a collision will be produced.

To this end, a local network tester is realized, of small size, at low cost, because it uses circuits which are widely available commercially, and offering a great flexibility of utilization, and excellent performance, entirely adherent to lEEE standard 802.3.

According to the invention, the local network tester of the carrier sense multiple access method with collision detection (CSMA/CD) and bus architecture transmIssion system physical data transmission medium), with the network including at least one elementary segment having a number of statIons, is unique in that the tester includes a transmission and reception circuit which is analogous to those of the stations, including in addition a mechanism for generation of collisions, which emits a frame when it receives a signal from the encoding and decoding circuit associated with the transmission and reception circuit, which signal indicates the presence of a frame transmission from some station other than the tester, and an order for transmission on the part of the transmission control circuit, when the latter frame is received by the encoding and decoding circuit.

Other characteristics and advantages of the present invention will become more clear through the following description given by way of a non-limitational example, and with reference to the appended drawings.

In the drawings:

FIG. 1, composed of FIGS. 1a, 1b and 1c, shows in simplified schematic form how on the one hand, networks of the type of ETHERNET are constituted as a bus, or partly utilizing an optical star, and, on the other hand, a station (or DTE, or terminal).

FIG. 2 is a simplified functional schematic of a transmission and reception circuit of a station.

Figure 5:
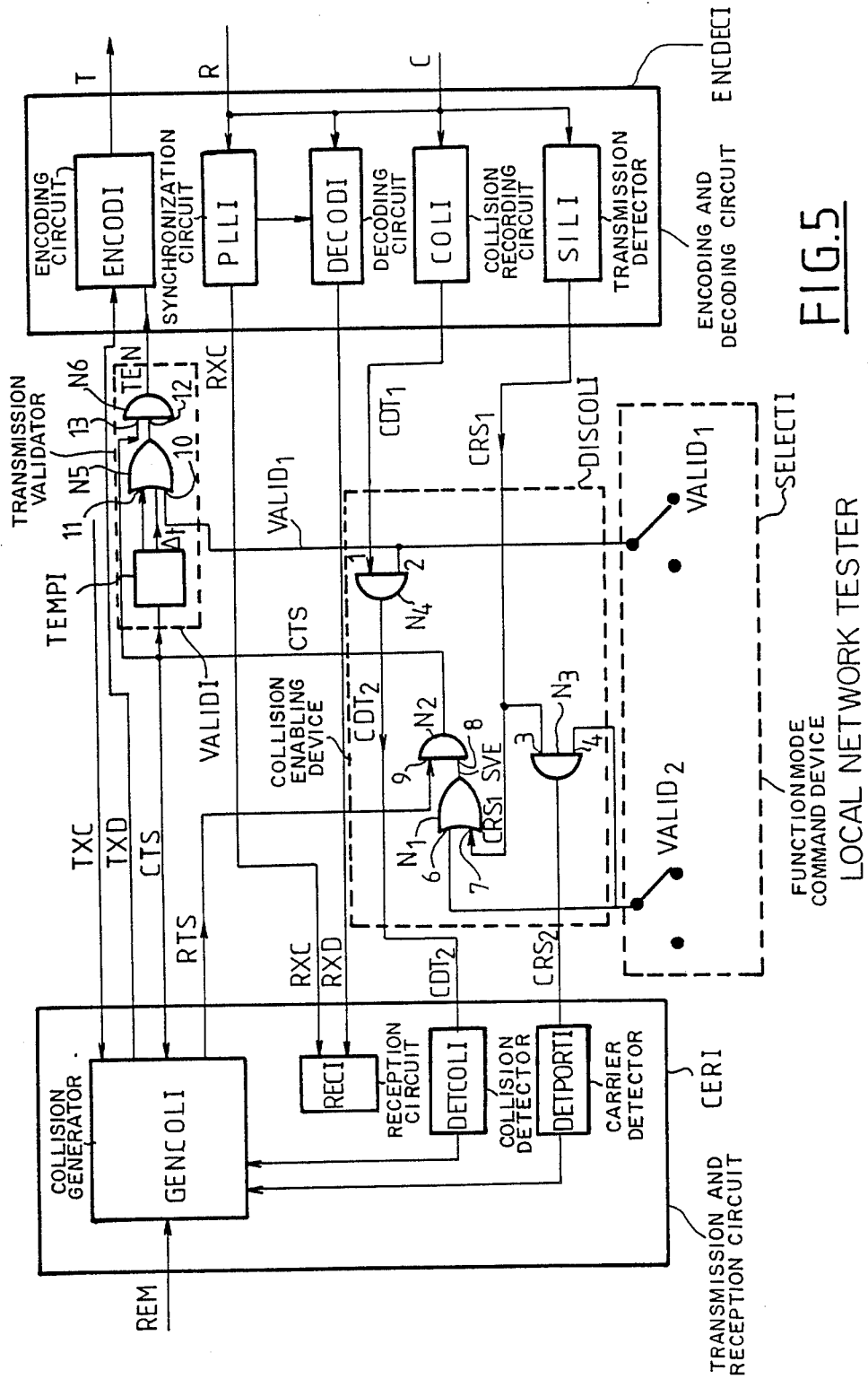
FIG. 5 is a particular mode of embodiment of the tester according to the invention shown in FIG. 4, notably utilizable for a local network of the type of ETHERNET.
Figure 6A:
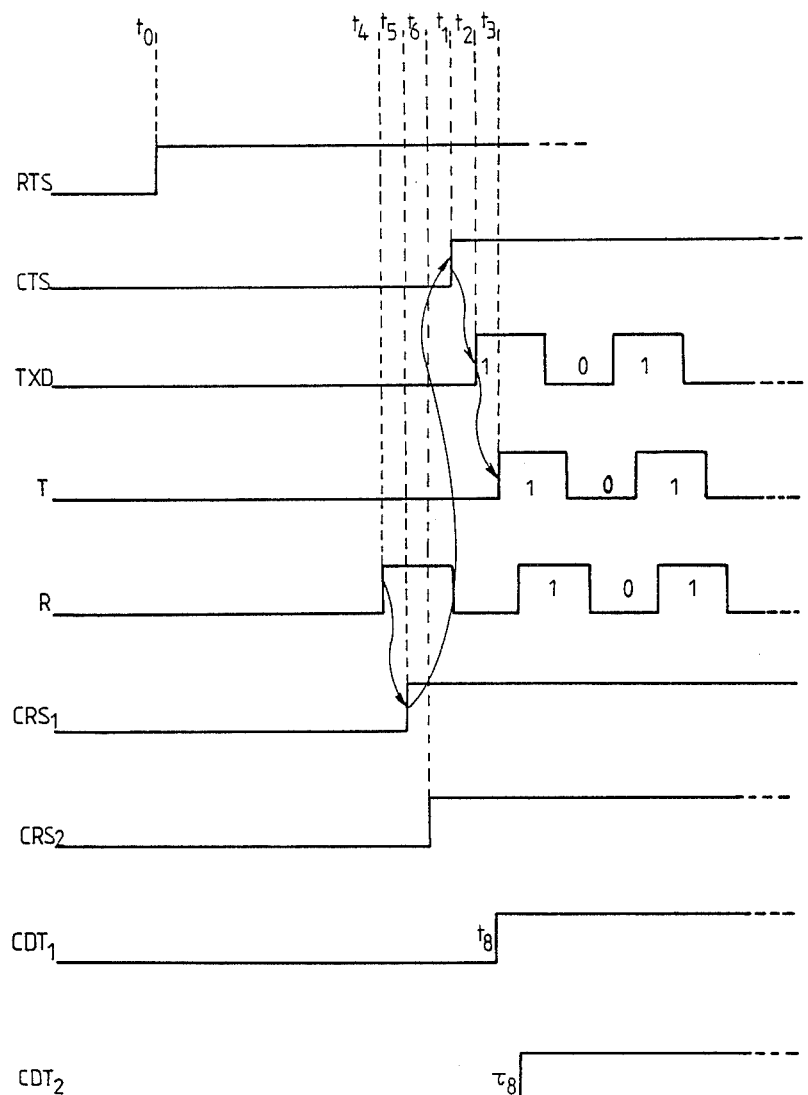
Figure 6B:
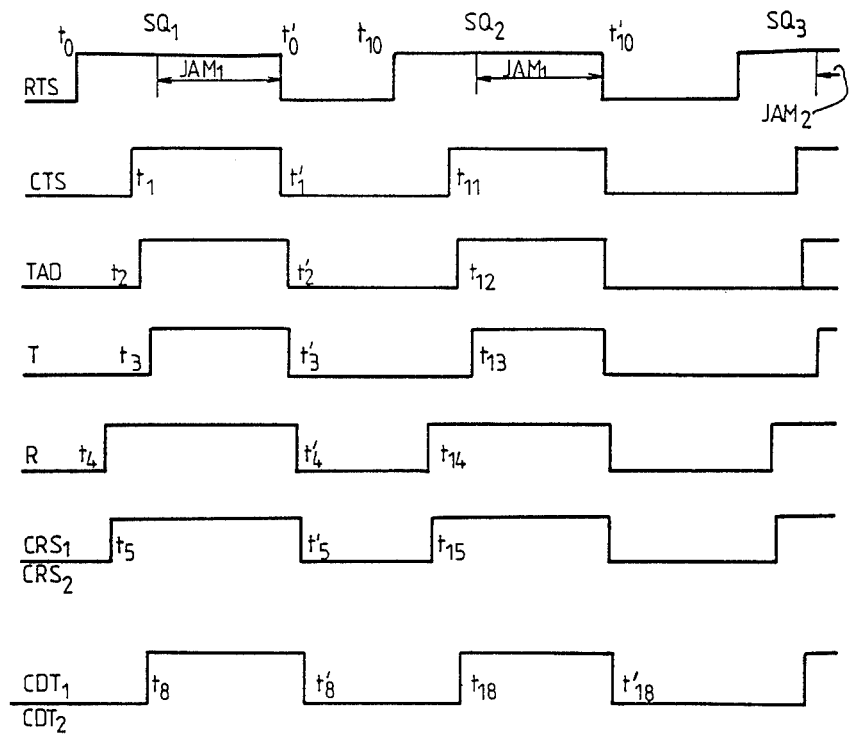

FIG. 6, composed of FIGS. 6a and 6b is a chronogram of signals transmitted or received by the local network tester according to the invention, shown in FIG. 5, according to a first mode of operation.

Figure 7:
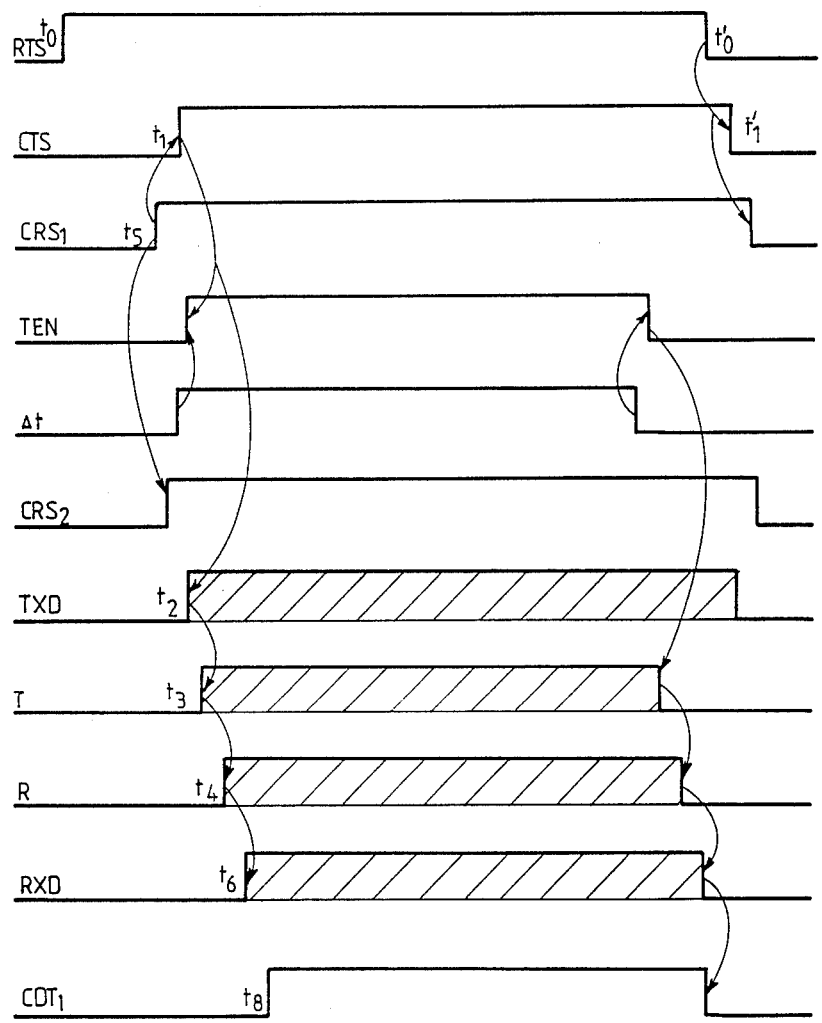

FIG. 7 is a chronogram of signals transmitted or received by the local network tester according to the invention, shown in FIG. 5, according to a second mode of operation.

DETAILED DESCRIPTION

In order to better understand how the local network tester according to the invention is configured and how it functions, certain reviews will be given as to the manner of configuration of local networks, the transmission and reception circuits of the various stations, and their mode of operation, as illustrated in FIGS. 1a, 1b, 1c, 2, 3a and 3b.

First to be considered is FIG. 1a. In this figure a local network RLE has been represented, which includes a number of elementary segments $SE_1$, $SE_2$, ..., $SE_j$, ..., $SE_p$.

Each elementary segment is seParated from the adjacent segment by a repeater. Thus, the elementary segment $SE_1$ is separated from the elementary segment $SE_2$ by the repeater $R_1$, and the elementary segment $SE_2$ is separated from the adjacent elementarY segment for example $SE_j$, by the repeater $R_2$. Generally, the base network consists of a segment of coaxial cable along which are distributed a number of connectors, to which access units can be connected. Thus the elementary segment $SE_1$ includes a number of connectors $RAC_1$, $RAC_2$, $RAC_3$, .... etc. There can be up to one hundred connectors on a single elementary cable segment. In FIG. 1a, only the three previously mentioned connectors have been represented. Likewise, the elementary segment $SE_2$ includes a number of connectors, of which only the connectors $RAC_{i-1}$, $RAC_i$, and $RAC_j$ have been represented. In FIG. 1a, only the connectors $RAC_n$ and $RAC_{n-1}$ have been represented for the elementary segment $SE_p$.

A number of stations are connected to each elementary segment by the intermediary of medium access units, with connection onto the coaxial cable constituting the segment being made in parallel. These medium access units, as indicated above, are familiar under the term transceiver. Thus the stations $S_1$, $S_2$ are connected to the elementary segment $SE_1$ by the transceivers $TRC_1$ and $TRC_2$. (These latter are connected to the connectors $RAC_1$, $RAC_2$.) The station $S_n$ is connected through the intermediary of the transceiver $TRC_n$ to the elementary segment $SE_p$.

It may be noted that the repeaters $R_k$ and $R_m$ shown in FIG. 1a are connected by an optical fiber FO, instead of being connected by a coaxial cable. This type of connection between repeaters tends to be used more and more for relatively great distances.

Figure 1B:
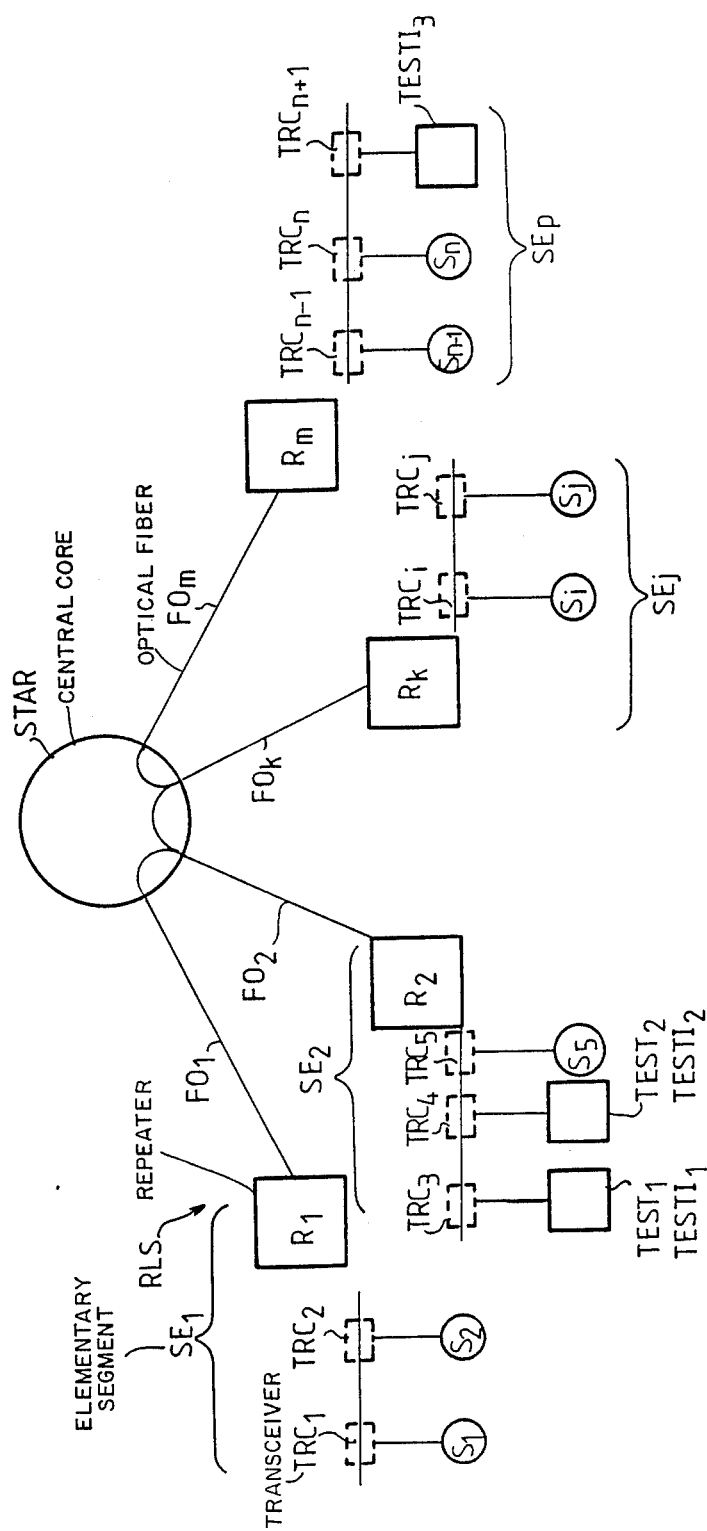

Consideration is given to FIG. 1b, which represents a local RLS network of the ETHERNET type with an optical star. In FIG. 1b, the same references as in FIG. 1a designate the identical elements. The RLS network thus includes a number of elementary segments $SE_1$, $SE_2$, $SE_j$, ..., $SE_p$. It also included a number of repeaters $R_1$, $R_2$, ..., $R_k$, ..., $R_m$.

The elementary segment $SE_1$ includes a number of stations $S_1$, $S_2$, ..., connected to a single coaxial cable through the intermediary of transceivers $TRC_1$, $TRC_2$, ..., etc.

The elementary segment $SE_j$ includes a number of stations $S_i$, $S_j$, ..., connected to a single coaxial cable through the intermediary of transceivers $TRC_i$, $TRC_j$, while the elementary segment $SE_p$ includes a number of stations ..., $S_n$, $S_{n-1}$, ..., etc, connected to a single coaxial cable through the intermediary of transceivers $TRC_{n-1}$ and $TRC_n$.

The elementary segment $SE_1$ is connected to the repeater $R_1$, itself connected through the intermediary of an optical fiber $FO_1$ to a central core STAR. constituted by an optical star. LIkewise, the elementary segment $SE_2$ is connected to the central core STAR through the intermediary of an optical fiber $FO_2$, while the repeaters $R_k$ and $R_m$ are connected to the central core STAR respectively through the intermediary of the optical fibers $FO_k$ and $FO_m$. Comparing the FIGS. 1a and 1b, the structural differences between a local RLE network and a local RLS network with an optical star are immediately apparent. In the fIrst of these networks, the various repeaters (for example $R_1$ and $R_2$) are connected to one another through the intermediarY of an elementary segment (for example $SE_2$), whereas in the second of these networks, one repeater (for example $R_1$) is connected to an adjacent repeater (for example $R_2$) in part through the intermediary of optical fibers, and in part through the central core STAR (optical fiber $FO_1$, central core STAR, optical fiber $FO_2$).

The mode of functioning of the two tYpes of networks is comparable.

Consideration is now given to FIG. 1c, which represents in a highly schematic fashion, the various constituent elements of a station for example station $S_i$. As an example, a station $S_i$ has been chosen which is connected through the intermediary of the transceiver $TRC_i$ to the elementary segment $SE_2$ of the local RLE network of FIG. 1a. This station $S_i$ includes a cIrcuit to control the various operations executed by the station $S_i$, namely a microprocessor MICPROC a memory MEMO which stores the various Information to be transmitted or received by the station $S_i$, a transmission and reception circuit CER, connected through the intermediarY of an encoder-decoder ENCDEC to the transceiver $TRC_i$, a disk controller CDIS and a controller CONS for a console VISU, and potentially other controllers. The various elements MICPROC, MEMO, CER, CDIS, C0NS are connected to a single bus B.

When the station $S_i$ wishes to transmit a message over the segment $SE_2$ of the RLE network, the microprocessor MICPROC gives the transmission command, which is sent to the transmission and reception circuit CER. This circiit receives the data to be transmitted, which was stored within the memory MEMO, and sends the data through the encoder ENCDEC and the transceiver $TRC_i$ over the segment $SE_2$. This transmission of data occurs in the form of a succession of data frames separated by interframe delays, as explained above. The coder ENCDEC transmits the data according to a Manchester code.

Figure 3A:
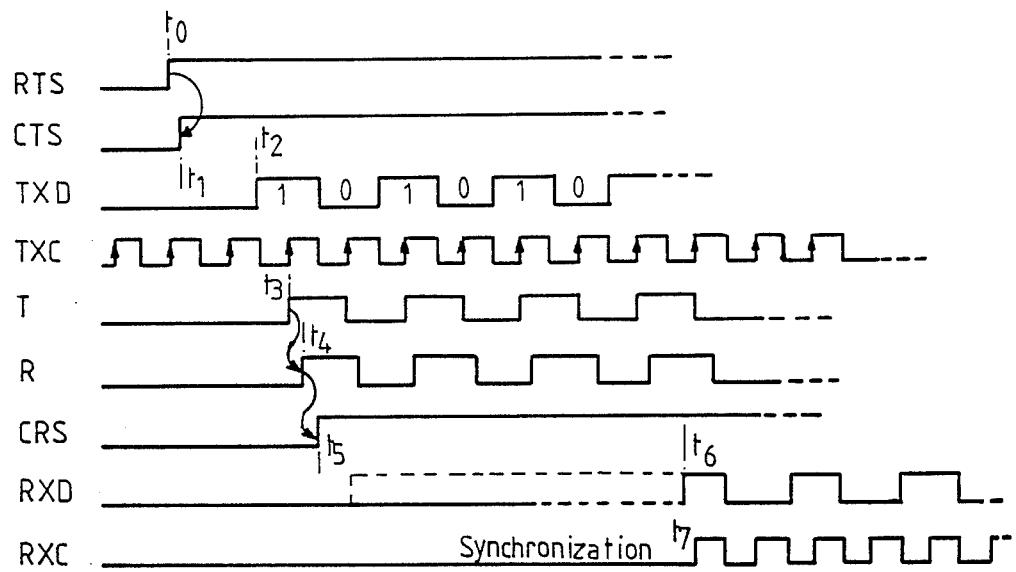
FIGS. 3a and 3b, is a chronogram of different signals transmitted and received by the transmission and reception circuit of FIG. 2.
Figure 3B:
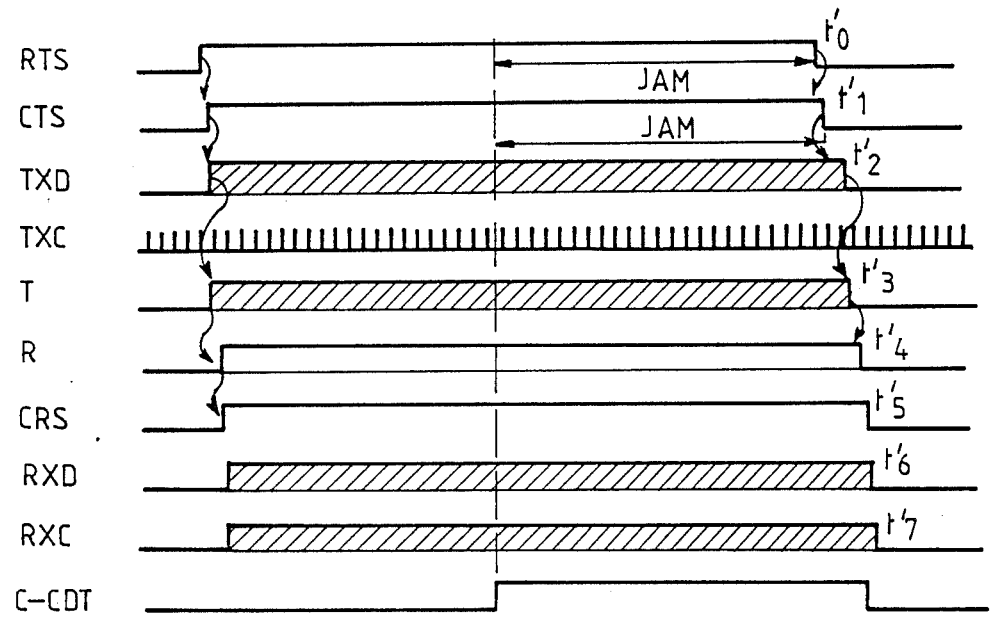

Next to be considered are FIGS. 2, 3a and 3b. In FIG. 2, a simplified representation is presented of the transmission reception circuit CER associated with an encoding and decoding circuit ENCDEC associated with the station $S_i$ of FIG. 1c. Also appearing in FIG. 2 is the access unit (transceiver) $TRC_i$.

The transmission and reception circuit CER comprises:
- a transmission circuit EM,
- a reception circuit REC,
- a carrier detector DETPORT,
- a collision detector DETCOL.

The transmission and reception circuit CER can be embodied in the form of a very highly integrated VLSI circuit manufactured by the INTEL Corporation under the designation The encoding and decoding circuit ENCDEC comprises:
- an encoding circuit ENCOD,
- a decoding circuit DECOD,
- a synchronization circuit of the PLL phase locking type,
- a detector SIL for detection of the presence of a transmission signal on any of the stations of the local network (which may also be termed "detector of absence of silence"),
- a collision detection circuit COL.

The encoding and decoding circuit ENCDEC is implemented, for example, in the form of a very highly integrated VLSI circuit, manufactured by the INTEL Corporation under the designation 82501.

The access unit $TRC_i$ to the transmission medium BUS is an electronic device to link the station $S_i$ to the network. This device is standardized by the IEEE This access unit $TRC_i$ comprises notably:
- a first amplifier $A_1$,
- a second amplifier $A_2$,
- a collision detector DEC.

The constituent elements of the circuits CER, ENCDEC and $TRC_i$ are not especially detailed in this description. The manner of construction of each of the constituent elements is described in a much more detailed manner in the technical reports of the manufacturer INTEL as regards the circuits CER and ENCDEC, and in the IEEE standard for the transceiver $TRC_i$.

We will limit ourselves here to description of the broad lines of operation of these three circuits, referring to FIGS. 3a and 3b.

All of the signals transmitted and received by the circuits CER, ENCDEC, $TRC_1$ conform to the CSMA/CD access protocol defined above.

At the instant $t_O$, the transmission circuit EM receives a transmit command REM, which is sent by the control circuit MICPROC. The circuit EM then emits a signal RTS equal to logical I, at the same instant $t_O$, if it is confirmed that there is no transmission issuing from another station of the network RLE In normal operation (FIG. 3a) the transmission circuit EM receives the signal CTS at the instant $t_1$, slightly later than $t_O$, and then begins transmission of a frame of data according to the standard format for networks of the CSMA/CD type, if no other station is transmitting at that moment. The frame TXD is transmitted at the instant $t_2$, later than $t_1$, and is composed of a sequence of bits equal to 1 or 0, with the data of the frame TXD being generated by the EM circuit at first (preamble), then extracted, for example, from the memory MEMO shown in FIG. 1c. The data contained in the frame TXD is synchronized by clock signals TXC regulated by an external clock (for example quartz crystal), not represented, in order to simplify FIG. 2.

The signals CTS, TXD, TXC are sent to the encoding circuit ENCOD. This circuit encodes the data of the frame TXD according to the Manchester code cited above, and sends the frame in the form of a signal T synchronized by the clock signal TXC, to the transceiver $TRC_i$. It is transmitted beginning at the instant t later than the Instant $t_2$.

The signal T is amplified by the amplifier $A_1$, and sent onto the physical transmission medium BUS of the network RLE.

The transceiver $TRC_i$ (in the absence of any other transmission from any of the other stations of the network RLE) receives the frame sent by the encoding circuit ENCOD. It amplifies the signal by virtue of the amplifier $A_2$, which then delivers a signal R analogous to the signal T, but displaced in time with respect to it, the signal R having been sent by the amplifier $A_2$ to the decoding circuit DECOD of the circuit ENCDEC at the instant $t_4$, later than the instant $t_3$. The signal R is also sent to the synchronization circuit PLL, and to the detector of the presence of a transmission SIL. The synchronization circuit PLL, of the familiar phase-lock loop type, emits the transmission-reception synchronization signal RXC, which is sent to the reception circuit REC of the transmission-reception circuit CER. This reception circuit REC also receives the signal RXC which is emitted by the decoding circuit DECOD at the instant $t_6$, later than the instant $t_4$. The time delay separating the instants $t_6$ and $t_4$ has a duration corresponding to the emission of a few bits. This corresponds to the time necessary for the circuit PLL, at the instant $t_7$, to reconstruct the clock data RXC from the signal R. The detector SIL for Its part emits at the instant $t_5$, later than $t_4$ ($t_5$ lies between $t_4$ and $t_6$), a signal CRS equal to logical 1, which signifies that there is data present on the lines carrying the signals R and RXD. This signifies that there is present a transmission of data somewhere in the network (referring- here of course to the data transmitted by the station $S_i$ itself, since each station receives the data it itself transmits, as described above). The circuit REC transmits the data it receives to the memory MEMO.

When there is present on the physical transmission medium of the network, a transmission made simultaneously by a station other than the station $S_i$, the collision detector DEC of the transceiver $TRC_i$ is actuated, and emits a signal C indicating a collision, which is sent to the collision detection circuit COL of the circuit ENCDEC, which transmits this signal in the form of another signal CDT, to the collision detector DETCOL of the transmission and reception circuit CER (FIG. 3b). This circuit transmits the signal CDT equal to a logical 1 to the transmisssion circuit EM. This circuit will continue to transmit for a certain time, termed the jam duration, a jamming signal. At the end of transmission of jamming data, the signals RTS, CTS, TXD, T, R, CRS, RXD and RXC fall successively to logical zero, as indicated in FIG. 3b, at the instants $t'_0$, $t'_1$, $t'_2$, $t'_3$, $t'_4$, $t'_5$, $t'_6$, $t'_7$.

As was indicated previously, a local network tester must test the network installed by the installers in the private domains which are to be equipped. Verification of good functioning of the network is carried out once the work of installation is finished.

To perform acceptance testing of a local network which has just been installed, including the active components, the transceivers and repeaters (it does not matter whether or not the stations are connected to the network), two testers are used, $TEST_1$ and $TEST_2$, which are placed successively at different locations of the network As can be seen in FIG. 1a, the tester $TEST_1$ is shown installed on the elementary segment $SE_1$, and is connected to the physical transmission medium BUS through the transceiver $TRC_3$. The tester $TEST_2$ is connected to the elementary segment $SE_1$ through the transceiver $TRC_4$.

In FIG. 1b, the two testers $TEST_1$ and $TEST_2$ are shown connected to the elementary segment $SE_2$ through the transceivers $TRC_3$ and $TRC_4$ respectively.

The two testers are thus to be placed in different locations of the network. These are mobile stations which have the goal of verifying that the network is functioning correctly. To this end, they send normal messages, entirelY identical to the messages sent bY the various stations. In addition, theY create abnormal operating conditions, to see whether this is detected.

Figure 4:
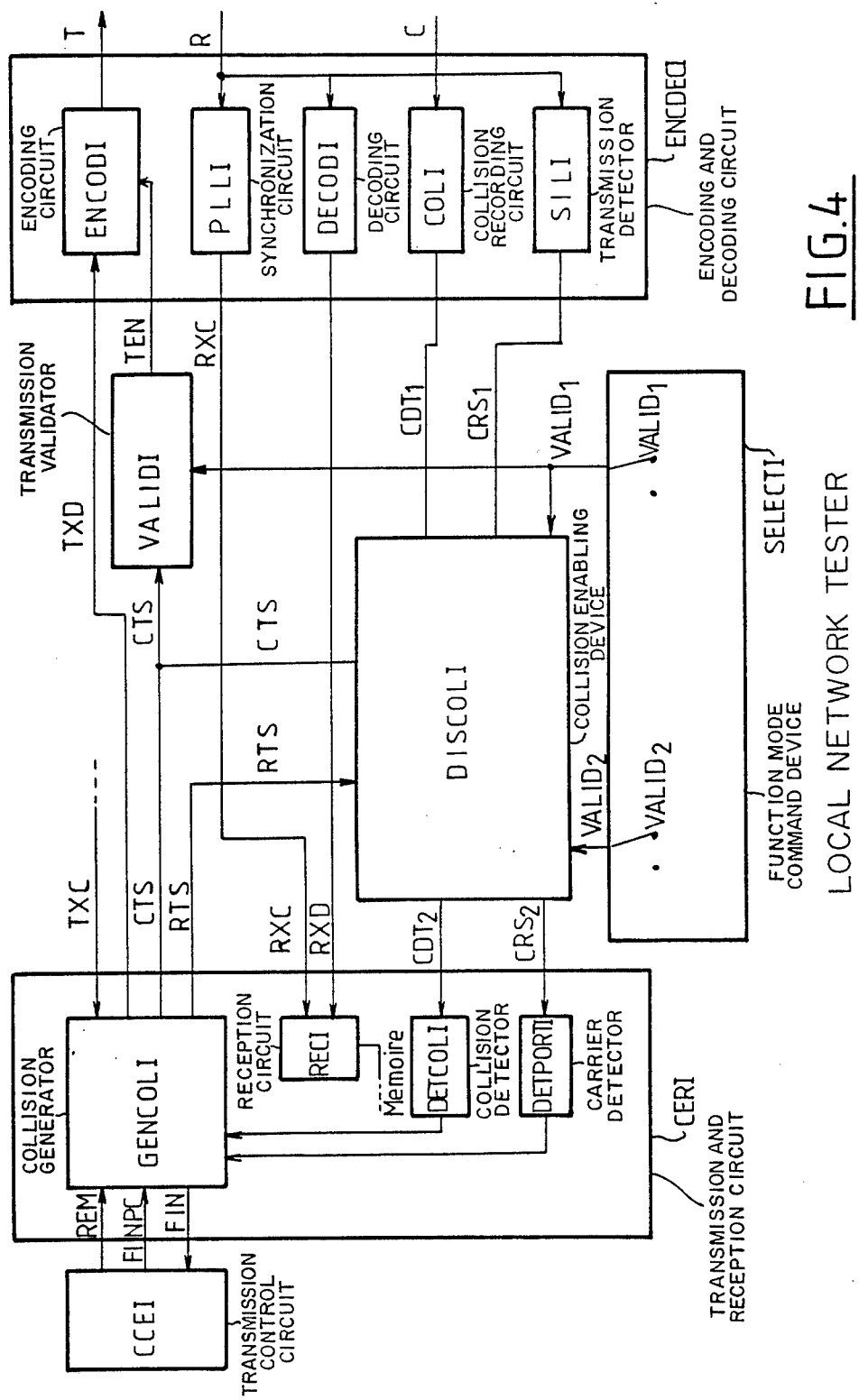
FIG. 4 shows a local network tester according to the invention, with collision generation, notably utilizable for a network of the type of ETHERNET.

The goal of the tester TESTI according to the invention, shown in FIG. 4, is notably to verify proper functioning of the set of collision detectors contained in the transceivers and in the repeaters of both the network RLE of the ETHERNET type, shown in FIG. 1a, and the network RLS, shown in FIG. 1b.

The tester TESTI according to the invention, shown in FIG. 4, includes the following essential component elements:
  the transmission and reception circuit CERI,
  the encoding and decoding circuit ENCDECI,
  the collision enabling device DISCOLI,
  the mechanism for validation of transmission VALIDI,
  the device SELECTI for control of modality of operation,
  the transmIssion control circuit CCEI.

The encoding and decoding circuit of the tester according to the invention comprises: an encoding circuit ENCODI, a decoding circuit DECODI, a synchronization circuit PLLI, a presence of transmission detector SILI, a collision recording circuit COLI. All of these elements are identical to the corresponding elements of the encoding and decoding circuit ENCDEC shown in FIG. 2.

The transmission and reception circuit CERI comprises the following constituent elements:
  the collision generator GENCOLI,
  the reception circuit RECI,
  the carrier detector DETPORTI,
  the collision detector DETCOLI.

The elements RECI, DETPORTI, DETCOLI are strictly analogous to the corresponding elements of the circuit CER of FIG. 2, and have the same functions.

The collision enabling device DISCOLI is positioned between the circuits CERI and ENCDECI. It is controlled by the function mode command device SELECTI.

The collision enabling device DISCOLI receives the signals $CRS_1$ and $CDT_1$ sent resPectively by the presence of transmission detector SILI and the detectIon cIrcuit COLI, as well as the signals $VALID_1$ and $VALID_2$ emitted by the function mode command device SELECTI. It also receives the signal RTS, and transmits the signal CTS. It sends the signals $CRS_2$ and $CDT_2$ to the carrier detector DETPORTI and to the collision detector DETCOLI.

The transmission validation device VALIDI is also positioned between the circuits CERI and ENCDECI. It receives the signal CTS sent by the collision enabling device DISCOLI and the signal $VALID_1$. It emits the signal TEN sent to the encoder ENCODI.

The signals transmitted or received by the circuit CERI or the encoding circuit ENCDECI, those being TXC, TXD, RXC, RXD, RTS, CTS are designated in the same manner as in FIGS. 2, 3a and 3b, and have the same functionality.

The transmission control circuit( CCEI emits a signal REM sent to GENCOLI, while transmission is required (for example on the part of the operator who is utilizing the tester according to the invention), and then actuates the circuit CCEI.

To better understand the functioning of the tester TESTI according to the invention, it is important first to specify the role of the SELECTI device, and the two signals it delivers, $VALID_2$ and $VALID_1$.

This device can be controlled by the operator who utilizes the tester TESTI according to the invention.

According to the value of $VALID_2$, the tester according to the invention can:

(1) operate as a normal station: In this case, for example, $VALID_2$ is equal to logical 1 GENCOLI functions exactly like the circuit EM-of the circuit CER of FIG. 2 When there is a transmission request REM, GENCOLI transmits RTS, and the DISCOLI device emits CTS, which is transmitted on the one hand to GENCOLI, and on the other hand to VALIDI, which retransmits it to the circuit ENCODI, which produces the signal T. $CRS_2$ and $CDT_2$ are strictly identical to $CRS_1$ and $CDT_1$. (See FIGS. 3a and 3b.)

(2) or, it can operate according to a collision mode which will be descrIbed below. $VALID_2$ is equal to logical zero. It thus falls within the framework of the invention itself.

In this case, the operating mode of the tester TESTI according to the invention shown in FIG. 4 will be better understood with reference to FIGS. 6a and 6b, as well as to FIG. 7.

The essential idea directing the operating of the tester according to the invention is the following; it consists of emitting, when there is a transmission request, a signal RTS by means of GENCOLI at the instant $t_0$, and returning the signal CTS at the instant $t_1$ through the intermediary of the mechanism DISCOLI (that is, authorizing the transmission of one frame of data), only if a data message is passing through the network RLE, that is, if the signal $CRS_1$ sent by the presence of transmission detector SILI, at the instant $t_5$, is active, that is, equal to logical 1. In other words, after the signal RTS rises to logical 1 at the instant $t_0$, the collision generator GENCOLI waits for a data message passing over the network, to begin its transmission, and then transmits the signal TXD at the instant $t_2$. The device VALIDI, by means of the signal TEN, then validates the transmission by ENCODI of the signal T. The message passing over the network is designated as R, and is shown in FIG. 6a. It begins to be received at the instant $t_4$, and is composed of a frame of data conforming to the IEEE standards. The signal $CRS_2$, according to one mode of embodiment of the invention, can remain equal to logical zero.

It is clear that there is then a collision present, since there Is simultaneously the presence of a transmission in the form of a signal T, sent by the circuit ENCDECI. and also a data frame R sent by some station of the network. Consequently, there is detection of a collision at the transceiver $TRC_i$, and issuance, by the collision detection circuit COLI, of a collision signal $CDT_1$, at the instant $t_8$, which is transmitted to the collision detector DETCOLI through the device DISCOLI, at the instant $\tau_8$ (near $t_8$), in the form of the signal $CDT_2$ (and also retransmitted by DETCOLI to GENCOLI).

It may be said that the signal CTS is a collision authorization signal.

It can be considered that one of the essential characteristics of the invention consists in replacing the transmission circuit EM contaIned within the circuit CER of FIG. 2 with a collision generator GENCOLI, which transmits only if there is present a message transmitted over the network by another station. In other words, the collision generator GENCOLI transmits only if there is simultaneous detection of the presence of a carrier by the circuit SILI (signal $CRS_1$) and if there is some transmission request or transmission command (REM, see above).

It is thus seen that whereas the transmission circuit EM of the transmission and reception circuit CER shown in FIG. 2 transmits messages only if there is silence throughout the network, the collision generator GENCOLI transmits only if there is presence of a message over :he network.

At this stage of the operations performed by the transmIssIon and reception circuit $CER_1$, according to a feature of the tester according to the invention, there are two possibilities available, each defined by a different value of the signal $VALID_1$ (FIGS. 6b and 7).

(1) First possibility: multicollision mode: $VALID_1$ is equal to logical 1.

The signal $CDT_1$ is transmitted in the form of the signal $CDT_2$ to the collision generator GENCOLI, by the collision detector DETCOLI. The signal TEN is identical to CTS. The collision generator GENCOLI then transmits jam data, then ceases to transmit (all signals, RTS, CTS (TEN), TXD, T, R, $CDT_1$ and $CDT_2$, while $CRS_1$ falls to logical zero, at the respective instants $t'_0$, $t'_1$, $t'_2$, $t'_3$, $t'_4$, $t'_5$, $t'_8$). The collision generator GENCOLI, under control of a transmission control circuit (embodied in the form of a microprocessor, for example analogous to those of the stations (see FIG. 1c)) applies the "BACKOFF" algorithm defined bY IEEE standard 802.3, and attempts 16 times, at semi-random intervals, to retransmit the same frame, that is, there is a series of identical sequences comprising analogous signals, namely the sequences $SQ_2$ to $SQ_{16}$, which reproduce the first sequence $SQ_1$. Thus, for the sequence $SQ_2$, the signal RTS is transmitted at the instant $t_{10}$, the signal CTS at the instant $t_{11}$, etc., with the signal $CDT_1$ being transmitted at the instant $t_{18}$. Likewise, the same signals fall back to logical zero at the instants $t'_{10}$ to $t'_{18}$. It is obvious that an analogous argument can be made for the sequences $SQ_3$ to $SQ_{16}$ (not shown). At the end of 16 fruitless attempts, the collision generator GENCOLI, by means of a signal FIN, alerts the transmission control circuit CCEI, which gives the order (signal FINPC) to the collision generator to abandon the production of collisions. Thus, the multicollision mode makes available an automatic means to carrY out up to 16 successive collisions. The number can be programmed differentlY within this limit; that is, it could be less than or equal to 16, with the multicollision mode operation being Invalidated by the transmIssIon control cIrcuIt after a certain number of sequences, acting upon the selection interrupter SELECTI, which causes the signal $VALID_1$ to fall to logical 0. A variation of embodiment consists in controlling SELECTI by a microprocessor program.

(2) Second possibility: monocollision mode: $VALID_1$ is equal to logical 0.

The signal $CDT_1$ is not validated by the device DISCOLI, which therefore does not transmit the signal $CDT_2$ to the collision generator GENCOLI. The collision generator thus does not observe the collision, and continues normallY the transmission of its message TXD. This message, because it is normal (that is, conformant to the frame format as defined in the IEEE standard), has a duration greater than the duration of any collided message. If it is desired that the message transmitted by the collision generator GENCOLI in the presence of the collision detected have the specified duration (that is, the duration of a message with collision), the operation of the encoding and decoding circuit ENCDECI can be inhibited. This interrupts the transmission of the message, although the generator GENCOLI completes its normal transmission, according to the standard frame format. The transmission of data T to the transceiver is thus authorized only during a time $\Delta T$ during which the signal TEN delivered by VALIDI is equal to logical 1. When the signal TEN falls back to logical 0 (see FIG. 7), the signals T, R, RXD, and $CDT_1$ fall to logical 0 successively.

Consideration will be given to FIG. 5, which represents a particular mode of embodiment of the tester TESTI according to the invention.

The device DISCOLI includes an OR gate $N_1$, an AND gate $N_2$, an AND gate $N_3$ and an AND gate $N_4$.

The gate $N_4$ is placed between the collision detecting circuit COLI and the collision recording circuit DETCOLI of the circuit CERI. It receives at its inputs 1 and 2 respectively, the signals $CDT_1$ and $VALID_1$. lt produces the signal $CDT_2$.

The gate $N_3$ receives at its inputs 3 and 4 respectively the signals $CRS_1$ and $VALID_2$ (collision mode). This gate $N_3$ delivers the signal $CRS_2$, which is sent to the carrier detection circuit DETPORTI of the circuit CERI.

The OR gate $N_1$ receives at its inputs 6 and 7 respectively the signal $CRS_1$ and the signal $VALID_2$. This gate delivers a signal SVE which is equal to logical 1 when the signal $CRS_1$ or the signal $VALID_2$ is equal to logical 1. This transmission validation signal SVE is sent to the input 8 of the AND gate $N_2$ whose second input 9 receives the signal RTS sent by the collision generator GENCOLI. The signal delivered by $N_2$ is CTS, which is sent to GENCOLI, and to the validation device VALIDI. The latter includes a timing circuit TEMPI, an OR gate $N_5$ with two inputs 10 and 11, and an AND gate $N_6$ with two inputs 12 and 13. The circuit TEMPI receives the signal CTS and retransmits it in the form of a signal $\Delta t$ of determined duration ($\partial t$) to the input 11 of the OR gate $N_5$, whose input 10 receives the signal $VALID_1$. The signal $\Delta t$ is transmitted by the OR gate $N_5$ to the input 12 of the AND gate $N_6$, whose input 13 receives the signal CTS. This gate $N_6$ sends the signal TEN to the circuit ENCODI.

In a second particular embodiment of the invention, the tester TESTI can operate according to three modalities:

(a) collision mode: In this case, the tester TESTI functions according to one of the two modes of multicollision or monocollision described above. The tester is a slave unit.

(b) transmission mode: (see also above) In this case, the circuit GENCOLI operates exactly in the same manner as the circuit EM of any of the stations $S_i$ of the network (see FIGS. 2, 3a, 3b). The tester is a master unit.

(c) reception mode: in this case, only the circuit RECI of the tester TESTI operates (the transmission circuit GENCOLI not operating), in the same manner as the reception circuit REC of the circuit CER shown in FIG. 2. (Sending the signals it has received to a memory, not represented, for simplification, which plays the same role as the memory MEMO of FIG. 1c.)

The operation of the testor, as shown in FIG. 5, is therefore as follows:

In the transmission mode, $VALID_2$ is equal to one. At the time of transmission of the signal RTS by GENCOLI, because $SVE = VALID_2 + CRS$ (OR gate $N_1$) is equal to one (which is the same as to say that SVE is true), the signal CTS emitted bY the AND gate $N_2$ is equal to logical one, and the signal TXD is thus transmitted to the encoder. Moreover, $VALID_1$ is such that the signal TEN corresponds to CTS. The circuit ENC-DECI can thus encode the sIgnal TXD, and supply T. $CRS_2$ and $CDT_2$ are respectively identical to $CRS_2$ and $CDT_2$. (Sending the signals it receives to a memory, not represented, for simplification, which plays the same role as the memory MEMO of FIG. 1c.)

In the collision mode, $VALID_2$ is equal to zero. Thus $CRS_2$ is equal to logical zero (see AND gate $N_3$). Moreover, the signal SVE from the OR gate $N_1$ is true only if $CRS_1$ is equal to one.

In this case, if the collision generator GENCOLI receives a transmission request REM from the transmission control circuit of the tester (see above), it sends the signal RTS CTS, sent by the AND gate $N_2$, is equal to logical one if SVE is true, that is, if $CRS_i$ is equal to one.

The generator GENCOLI is thus authorized to transmit.

If the multicollision mode is in effect, $VALID_1$ is equal to one. The OR gate $N_5$ delivers a signal equal to one to the AND gate $N_6$, which also receives CTS, equal to logical one. Thus the signal TEN delivered b $N_6$ is equal to CTS. Moreover, because there is a collision (see above), $CDT_1$ is equal to logical one. The same is true for $CDT_2$, which is retransmitted by DETCOLI to the generator GENCOLI.

The generator, detecting the collision, emits a jamming signal. The operating of the tester according to the Invention Is thus that defined above, with reference to FIGS. 6a and 6b.

If the monocollision mode is in effect, $VALID_1$ is equal to zero, and thus $CDT_2$ is equal to logical zero, when $CDT_1$ is equal to one (gate $N_4$). GENCOLI, not detecting the collision, continues to transmit normally. TEN falls to logical zero when t falls to logical zero, at the end of a determined time interval. The circuit ENC-DECI then ceases to transmit the signal T.

In a particular mode of the invention, the tester TESTI is installed in a rectangular box, one of whose faces includes at least one luminous diode powered by the signal $CDT_1$. When a collision is detected, the diode lights, and informs the operator utilizing the tester that a collision has in fact been detected.

The testing of the various transceivers of different elementary segments of the network proceeds in the following manner, considering, for example, the elementary segment $SE_1$. (It is obvious that an analogous description could be given for each of the elementary segments.)

The two testers according to the invention $TESTI_1$ and $TESTI_2$ are connected, for example, to the transceivers $TRC_3$ and $TRC_4$ of the elementary segment $SE_1$ of the network RLE of FIG. 1a.

The first tester $TESTI_1$ operates according to the collision mode, while the second tester $TESTI_2$ operates according to transmission mode b.

It is evident that each of the two testers must detect the collision, and that the corresponding luminous diodes of the two boxes must light. If one of the testers does not detect the collision, this signifies that one of the two transceivers $TRC_3$ or $TRC_4$ is not operating correctly. By moving the two testers $TESTI_1$ and $TESTI_2$ along the elementary segment $SE_1$, it is possible to verify the proper operation of each of the collision detectors of all of the transceivers $TRC_1$ to $TRC_4$, etc.

To verify the proper operation of the repeaters, three testers are used, $TESTI_1$, $TESTI_2$ and $TESTI_3$ (see FIG. 1a), with the first two testers shown, for example, connected to the transceivers $TRC_3$ and $TRC_4$, and the third to the transceiver $TRC_{i-1}$ of the elementary segment $SE_2$.

The first tester, for example $TESTI_1$, operates in collision mode (slave), while the second tester $TESTI_2$ functions in the transmission mode (master), with the third tester functioning solely in the reception mode.

According to IEEE standard 802.3, when a repeater detects a collision, it emits a short frame. This frame must be detected by the tester $TESTI_3$. If this short frame emitted bY the repeater is not detected by the tester, it signifies that the repeater has malfunctioned (in this case the repeater $R_1$).

According to the IEEE standard 802.3, any repeater which detects on an elementary segment to which it is attached. 32 consecutive collisions, must take out of oPeration the elementary segment.

It is thus seen that the multicollisions mode which limits the number of collisions to 16 enables the repeater to detect the collisions correctly, those collisions being produced in a sufficient number, without the risk of having the elementary segment to which it is assigned taken out of operation.

On the other hand, in the monocollision mode, of the tester $TESTI_2$ functioning in the transmission mode sends frames in a cYclic fashion at a determined rate, it can be verified that the repeater will place out of operation an elementarY segment, when 32 successive collisions have been detected.

What is claimed is:

1. A tester for local networks having at least one elementary segment with a number of stations on the segment, each of said stations having a transmission and a reception circuit and an encoding/decoding circuit, the tester comprising:
   a transmission and reception circuit;
   an encoding/decoding circuit;
   means for detecting the presence of a transmission from a station;
   said transmission and reception circuit including a collision generating means responsive to the detection of a transmission presence;
   means for applying said frame of data through said encoding/decoding circuit to an elementary segment;
   means for detecting collisions; and
   means for verifying that said means for detecting collisions correctly detects collisions.

2. A tester as claimed in claim 1 further including means for generating a transmission request, said collision generating means being response not only to the detection of a transmission presence but also the receipt of said transmission request for emitting a frame of data.

3. A tester for local networks having at least one elementary segment with a number of stations on the segment, each of said stations having a transmission and reception circuit and an encoding/decoding circuit, the tester comprising:
- a transmission and reception circuit;
- an encoding/decoding circuit, said transmission and reception circuit and said encoding/decoding circuit being substantially analogous to the comparable circuits in said stations;
- means for detecting the presence of a transmission from a station;
- means for generating a transmission request;
- a collision generating means, included at least in part in said transmission and reception circuit, said generating means being responsive to the detection of a transmission presence and the receipt of said transmission request for emitting a frame of data;
- means for applying said frame of data through said encoding/decoding circuit to an elementary segment;
- means for detecting collisions; and
- means for verifying that said means for detecting collisions correctly detects collisions.

4. A tester as claimed in claim 3 including means for operating said tester in a multicollision mode.

5. A tester as claimed in claim 4 wherein the multicollision mode operating means includes means for detecting a collision, means for causing the collision generating means to generate a transmission request signal in response to said transmission request, to generate a transmission signal in response to the detection of a transmission presence, and to generate jamming data that are then transmitted over said network in response to a collision detection, transmission ceasing at the end of the jamming data, said transmission request signal, transmission signal and jamming data constituting a sequence, means for operating said causing means a predetermined number (n) of times to generate n successive sequences, and means responsive to the generation of the nth sequence for terminating the generation of said sequences.

6. A tester as claimed in claim 3 including means for operating said tester in either a multicollision mode or a monocollision mode.

7. A tester as claimed in claim 6 including means, intercoupled to said means for operating said tester, for generating a mode control signal having a first logical value when the tester is in the multicollision mode and a second logical value when the tester is in the monocollision mode.

8. A tester as claimed in claim 7 wherein the transmission and reception circuit of said tester may function in the same manner as the transmission and reception circuit of a station.

9. A tester as claimed in claim 8 including means, intercoupled to said means for operating said tester, for generating a control signal having a first logical value when the tester is to transmit and receive in the same manner as a station and having a second logical value when the tester is to be in the multicolllsion or monocollision mode.

10. A tester as claimed in claim 3 wherein said collision generating means includes collision authorization means operative in response to the detection of said transmission presence and to receipt of a transmission request for generating a collision authorization signal, and collision message generating means operative in response to said authorization signal for emitting said data frame.

11. A tester for local networks having at least one elementary segment with a number of stations on the segment, each of said stations having a transmission and reception circuit and an encoding/decoding circuit, the tester comprising:
- a transmission and reception circuit;
- an encoding/decoding circuit, said transmission and reception circuit and said encoding/decoding circuit being substantially analogous to the comparable circuits in said stations;
- means for detecting the presence of a transmission from a station;
- means for generating a transmission request;
- a collision generating means, included at least in part in said transmission and reception circuit, said generating means being responsive to the detection of a transmission presence and the receipt of said transmission request for emitting a frame of data;
- means for applying said frame of data through said encoding/decoding circuit to an elementary segment and
- means for operating said tester in a multicollision mode wherein the multicollision mode operating means includes means for detecting a collision, means for causing the collision generating means to generate a transmission request signal in response to said transmission request, to generate a transmission signal in response to the detection of a transmission presence, and to generate jamming data that are then transmitted over said network in response to a collision detection, transmission ceasing at the end of the jamming data, said transmission request signal, transmission signal and jamming data constituting a sequence, means for operating said causing means a predetermined number (n) of times to generate n successive sequences, and means responsive to the generation of the nth sequence for terminating the generation of said sequences.

12. A tester as claimed in claim 11 including means for generating a multicollision mode signal and wherein said causing means includes means responsive to a collision detection and to said multicollision mode control signal for generating a control signal to said collision generating means to cause it to generate said jamming data.

13. A tester as claimed in claim 11 further comprising means for operating said tester in a monocollision mode including means for causing said collision generating means to generate a transmission request signal in response to said transmission request and to generate a transmission signal in response to the detection of a transmission presence, and means for causing said encoding/decoding circuit to inhibit the transmission signal after a predetermined time.

14. A tester as claimed in claim 13 including means for generating a monocollision mode control signal; and wherein said means for applying said frame includes a collision detector said causing means includes means responsive to said collision detector and to said monocollision mode control signal for generating a signal causing said collision generating means to continue generating said transmission signal.

15. A tester for local networks having at least one elementary segment with a number of stations on the segment, each of said stations having a transmission and reception circuit and an encoding/decoding circuit, the tester comprising:
- a transmission and reception circuit;
- an encoding/decoding circuit, said transmission and reception circuit and said encoding/decoding circuit being substantially analogous to the comparable circuits in said stations;
- means for detecting the presence of a transmission from a station;
- means for generating a transmission request;
- a collision generating means, included at least in part in said transmission and reception circuit, said generating means being responsive to the detection of a transmission presence and the receipt of said transmission request for emitting a frame of data;
- said collision generating means includes collision authorization means operative in response to the detection of said transmission presence and to receipt of a transmission request for generating a collision authorization signal, and collision message generating means operative in response to said authorization signal for emitting said data frame; and
- means for applying said frame of data through said encoding/decoding circuit to an elementary segment.

16. A tester for local networks having at least one elementary segment with a number of stations on the segment, each of said stations having a transmission and reception circuit and an encoding/decoding circuit, the tester comprising:
- a transmission and reception circuit;
- an encoding/decoding circuit, said transmission and reception circuit and said encoding/decoding circuit being substantially analogous to the comparable circuits in said stations;
- means for detecting the presence of a transmission from a station;
- means for generating a transmission request;
- a collision generating means, included at least in part in said transmission and reception circuit, said transmission means being responsive to the detection of a transmission presence and the receipt of said transmission request for emitting a frame of data;
- means for applying said frame of data through said encoding/decoding circuit to an elementary segment;
- means for operating said tester in a multicollision mode wherein said multicollision mode includes means for detecting a collision, means for causing the collision generating means to generate a transmission request signal in response to said transmission request, to generate a transmission signal in response to the detection of a transmission presence, and to generate jamming data that are then transmitted over said network in response to a collision detection, transmission ceasing at the end of the jamming data, said transmission request signal, transmission signal and jamming data constituting a sequence, means for operating said causing means a predetermined number (n) of times to generate n successive sequences, and means responsive to the generation of the nth sequence for terminating the generation of sequences; and
- means for generating a multicollision control signal, and wherein said causing means includes means responsive to a collision detection and to said multicollision mode signal for generating a control signal for to said collision generating means to cause it to generate said jamming data.

17. A tester as claimed in claim 16 wherein said collision generating means includes collision authorization means operative in response to the detection of said transmission presence and to receipt of said transmission request for generating a collision authorization signal; and
- including validation means operative in response to said multicollision mode control signal and to said collision authorization signal for generating a validation signal, said validation signal being applied to said encoding/decoding circuit to authorize the encoding of said n successive sequences.

18. A tester as claimed in claim 17 wherein said collision generating means includes a collision authorization means operative in response to the detection of said transmission presence and to receipt of said transmission request for generating a collision authorization signal; and
- including invalidation means operative in response to said multicollision mode control signal and to said collision authorization signal for generating a validation signal, said validation signal being applied to said encoding/decoding circuit to authorize the encoding of said n successive sequences.

19. A tester for local networks having at least one elementary segment with a number of stations on the segment, each of said stations having a transmission and reception circuit and an encoding/decoding circuit, the tester comprising:
- a transmission and reception circuit;
- an encoding/decoding circuit, said transmission and reception circuit and said encoding/decoding circuit being substantially analogous to the comparable circuits in said stations;
- means for detecting the presence of a transmission from a station;
- means for generating a transmission request;
- a collision generating means, included at least in part in said transmission and reception circuit, said generating means being responsive to the detection of a transmission presence and the receipt of said transmission request for emitting a frame of data;
- means for operating said tester in a monocollision mode including means for causing said collision generating means to generate a transmission request signal in response to said transmission request and to generate a transmission signal in response to the detection of a transmission presence, and means for causing said encoding/decoding circuit to inhibit the transmission signal after a predetermined time;
- means for applying said frame of data through said encoding/decoding circuit to an elementary segment;
- means for generating a monocollision mode control signal and
- wherein said means for applying said frame includes a collision detector, said causing means includes means responsive to said collision detector and to said monocollision mode control signal for generating a signal causing said collision generating means to continue generating said transmission signal.

20. A tester as claimed in claim 19 wherein said collision generating means includes collision authorization means operative in response to the detection of said transmission presence and to receipt of said transmission request for generating a collision authorization signal; and including validation means operative in response to said monocollision mode control signal and said collision authorization signal for generating a validiation signal of predetermined duration, and means for applying said validation signal to control said encoding/decoding circuit to encode said transmission signal only during said duration.

21. A tester as claimed in claim 19 wherein said collision generating means includes collision authorization means operative in response to the detection of said transmission presence and to receipt of said transmission request for generating a collision authorization signal; and including validation means operative in response to said monocollision mode control signal and said collision authorization signal for generating a validation signal of predetermined duration, and means for applying said validation signal to control said encoding/decoding circuit to encode said transmission signal only during said duration.

22. A method for operating a local network tester in a multicollision mode comprising the steps of:

generating a transmission request;

detecting the presence on the network of a transmission from a station on the network;

detecting a collision;

generating a predetermined number (n) of successive sequences being sent onto the network, each of which sequences includes a transmission request signal generated in response to a transmission request, a transmission signal generated in response to the detection of a transmission presence, and jamming data generated in response to a collision detection; and terminating the generating of sequences in response to the generation of the nth sequence.

* * * * *